US010458287B1

(12) United States Patent
Rolinski et al.

(10) Patent No.: US 10,458,287 B1
(45) Date of Patent: Oct. 29, 2019

(54) COVER ASSEMBLY FOR A PUSHROD TUBE

(71) Applicant: Harley-Davidson Motor Company Group, LLC, Milwaukee, WI (US)

(72) Inventors: Adam Edward Rolinski, Milwaukee, WI (US); Winfred Bryan Alexander, II, Milwaukee, WI (US); Timothy John Trenkle, Germantown, WI (US); Thomas Charles Freinik, Colgate, WI (US)

(73) Assignees: Harley-Davidson Motor Company Group, LLC, Milwaukee, WI (US); Vulcan Industries Corporation, Germantown, WI (US)

( * ) Notice: Subject to any disclaimer, the term of this patent is extended or adjusted under 35 U.S.C. 154(b) by 0 days.

(21) Appl. No.: 15/992,912

(22) Filed: May 30, 2018

(51) Int. Cl.
*F01L 1/14* (2006.01)
*F16J 15/32* (2016.01)
*F01L 1/46* (2006.01)
*F02B 75/22* (2006.01)

(52) U.S. Cl.
CPC ............. *F01L 1/146* (2013.01); *F01L 1/46* (2013.01); *F02B 75/22* (2013.01); *F16J 15/32* (2013.01)

(58) Field of Classification Search
CPC .......... F01L 1/146; F01L 1/46; F01L 2103/00
USPC ...................................................... 123/90.61
See application file for complete search history.

(56) References Cited

U.S. PATENT DOCUMENTS 2,346,737 A * 4/1944 Essl .................... F01L 1/14
123/41 R
3,699,934 A * 10/1972 Gaipo .................. F01L 1/46
123/90.38

OTHER PUBLICATIONS

Old Assembly Drawing for Push Rod, publicly available or on sale prior to May 30, 2018 (2 pages).
Washer Drawing P/N# 6762B, publicly available or on sale prior to May 30, 2018 (2 pages).
Cover, Lower Push Rod Drawing P/N# 25700488, publicly available or on sale prior to May 30, 2018 (2 pages).
Cover, Upper Push Rod Drawing P/N# 17948-99, publicly available or on sale prior to May 30, 2018 (2 pages).

* cited by examiner

*Primary Examiner* — Jorge L Leon, Jr.
(74) *Attorney, Agent, or Firm* — Michael Best & Friedrich LLP

(57) ABSTRACT

A pushrod tube cover assembly for an engine includes a first tube configured to cover a pushrod and a second tube configured to cover the pushrod. The first tube has an inner diameter larger than an outer diameter of the second tube such that the second tube is configured to be slidably positioned in the first tube. An annular groove formed in a first end of the first tube, wherein a diameter of the groove is larger than the inner diameter of the first tube. An annular seal is disposed within the groove of the second tube to sealingly engage an outer surface of the second tube adjacent to a first end of the second tube.

17 Claims, 7 Drawing Sheets

COVER ASSEMBLY FOR A PUSHROD TUBE

BACKGROUND OF THE INVENTION

Some pushrod engines, including v-twin motorcycle engines, for example, include external pushrods extending between a hydraulic lifter tappet block and a cylinder head. The pushrods are enclosed in tubes so that the pushrods may move under normal engine operation without external exposure. Pushrod tubes may also provide a secondary oil return passage from the cylinder head and upper portions of a valve train (e.g., rocker arms, valves, valve springs, etc.) to a crankcase.

SUMMARY OF THE INVENTION

The present invention provides, in one aspect, a pushrod tube cover assembly for an engine. The pushrod tube assembly includes a first tube configured to cover a pushrod and a second tube configured to cover the pushrod. The second tube has an inner diameter larger than an outer diameter of the first tube such that the first tube is configured to be slidably positioned in the second tube. An annular groove formed in a first end of the second tube, wherein a diameter of the groove is larger than the inner diameter of the second tube. An annular seal is disposed within the groove of the second tube to sealingly engage an outer surface of the first tube adjacent to a first end of the first tube.

The present invention provides, in another aspect, a method for manufacturing a pushrod cover. The method includes the steps of providing a first tube having a first diameter, providing a second tube having a second diameter, the second diameter larger than the first diameter, forming a flange at a first end of the second tube, wherein the flange extends annularly from the first end at an angle, bending a portion of the flange at a second angle such that an annular groove is formed at the first end of the second tube, positioning an annular seal within the annular groove, and inserting the first tube into the second tube such that the seal is in sealing contact with an outer surface of the first tube.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
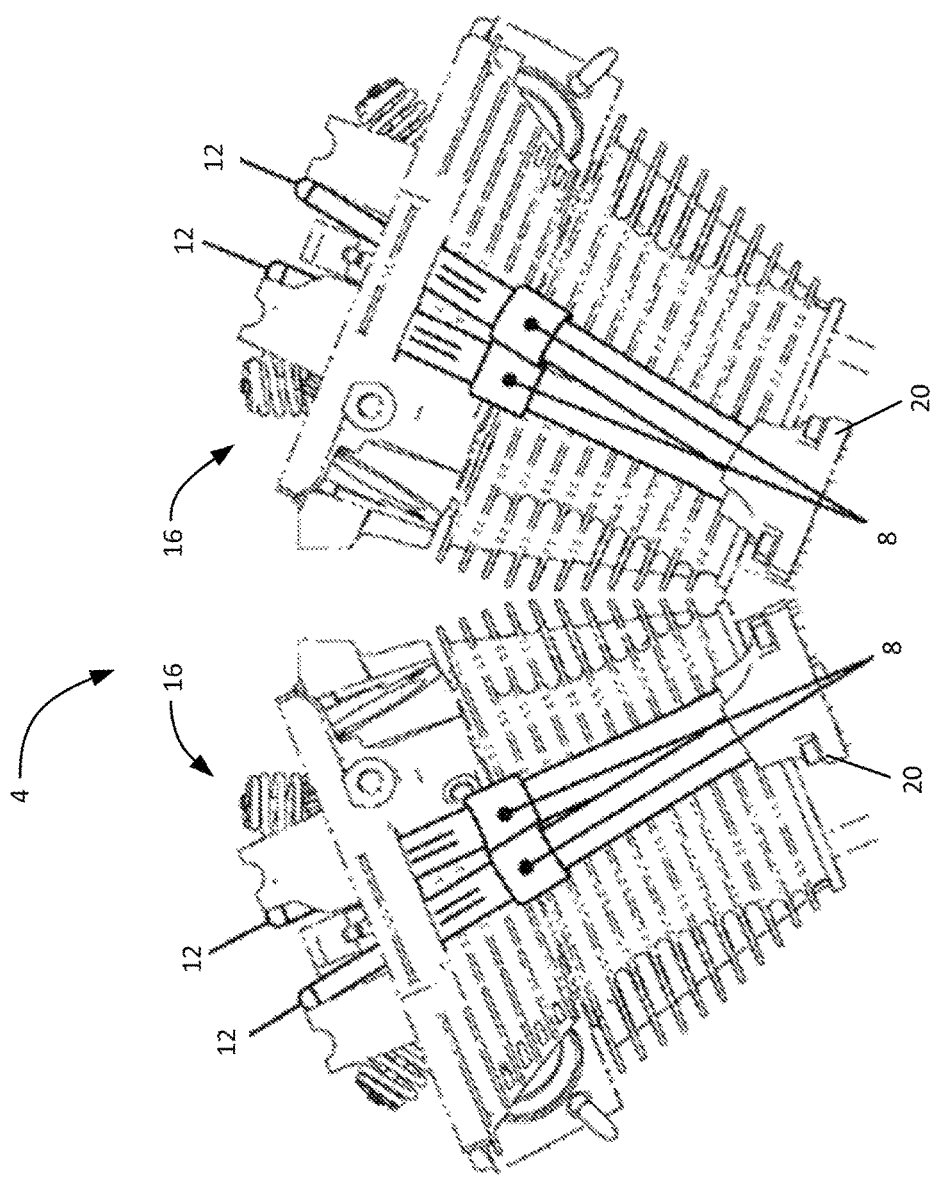
FIG. 1 is a perspective view of an example engine in which the pushrod cover assembly may be implemented.

FIG. 1 is a perspective view of an example engine 4 in which the pushrod tube cover assembly 8 may be implemented. The engine 4 in FIG. 1 is a v-twin engine having two pushrods 12 and two pushrod tube cover assemblies 8 for each cylinder of the engine 4. However, the pushrod tube cover assembly 8 described herein may be used in other engines. The pushrod tube cover assembly 8 covers the pushrod 12 to protect the pushrod 12 from external exposure. The pushrod tube cover assembly 8 extends between the cylinder head 16 and a hydraulic lifter tappet block 20 mounted on an upper side of a crankcase in which a camshaft is located. The pushrod tube cover assembly 8 may also act as a secondary oil return passage between the cylinder head 16 and other upper portions of the valve train (e.g., rocker arms, valves, valve springs, etc.) to a crankcase.

Figure 2:
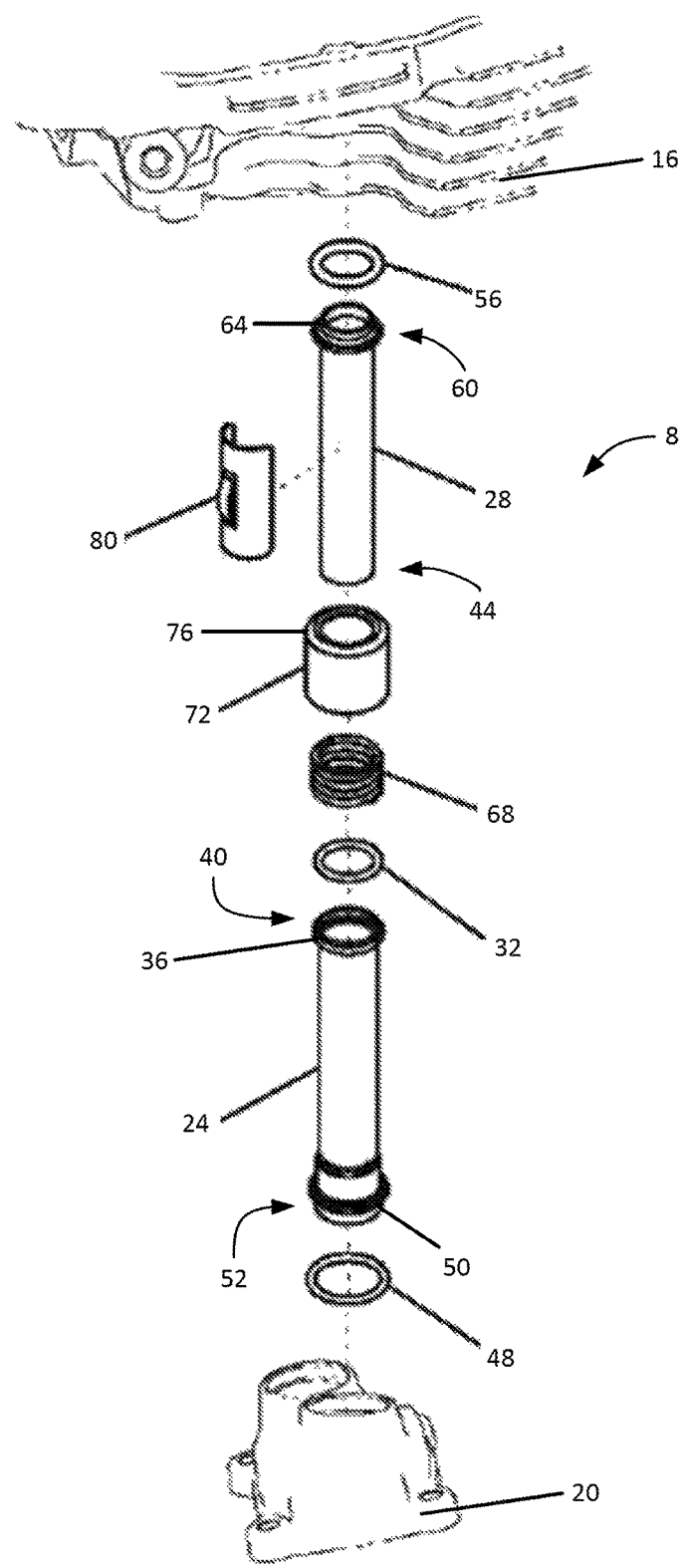
FIG. 2 is an exploded view of the pushrod cover assembly described herein.

FIG. 2 is an exploded view of the pushrod cover assembly 8. The pushrod tube cover assembly includes a first tube 24 (e.g., a lower tube) and a second tube 28 (e.g., an upper tube) configured to cover the pushrod 12. The first tube 24 has an inner diameter larger than an outer diameter of the second tube 28 such that the second tube 28 is configured to be slidably positioned in the first tube 24. The first tube 24 may slide relative to the second tube 28 as a result of movement of the tappet block 20 and/or the cylinder head 16 of the engine 4. Vibration of the engine 4 as the engine 4 is running may also cause the first tube 24 to move relative to the second tube 28. Because the pushrod tube cover assembly 8 acts as an oil return passage, it is important that the junction between the first and second tubes 24, 28 is sealed to prevent oil leakage.

An annular seal 32 (e.g., an o-ring) is disposed within a groove 36 at a first end 40 of the first tube 24 such that the annular seal 32 contacts an exterior or outer surface at a first end 44 of the of the second tube 28 to create a seal between the first tube 24 and the second tube 28. The surface of the second tube 28 where the seal 32 contacts the second tube 28 (e.g., a sealing surface 128 of FIG. 7) may have a finish different from a finish of the rest of the second tube 28 to facilitate a better seal between the annular seal 32 and the exterior of the second tube 28. For example, the sealing surface may have a smoother finish than the remainder of the second tube 28.

A second annular seal 48 is positioned at a second end 52 of the first tube 24. The second annular seal 48 is in contact with a seal seat 50 to maintain a position of the second annular seal 48 at the second end 52 of the first tube 24. The second annular seal 48 is configured to prevent leakage between the second end 52 of the first tube 24 and the tappet block 20. A third annular seal 56 is positioned at a second end 60 of the second tube 28. The third annular seal 56 is in contact with a second seal seat 64 to maintain a position of the third annular seal 56. The third annular seal 56 is configured to prevent leakage between the second end 60 of the second tube 28 and the cylinder head 16. The second and third annular seals 48, 56 are compressed by a spring 68. The spring 68 is covered with a retainer 72 and sits between an upper edge 76 of the retainer 72 and the first end 40 of the first tube 24. A keeper 80 keeps the spring retainer 72 in a position such that the spring 68 is pre-loaded when the pushrod tube cover assembly 8 is assembled. The keeper 80 is fixed to the second tube 28 such that the spring force action on the keeper 80 via the retainer 72 compresses the third annular seal 56. The spring force acting on the first end 40 of the first tube 24 compresses the second annular seal 48.

Figure 3:
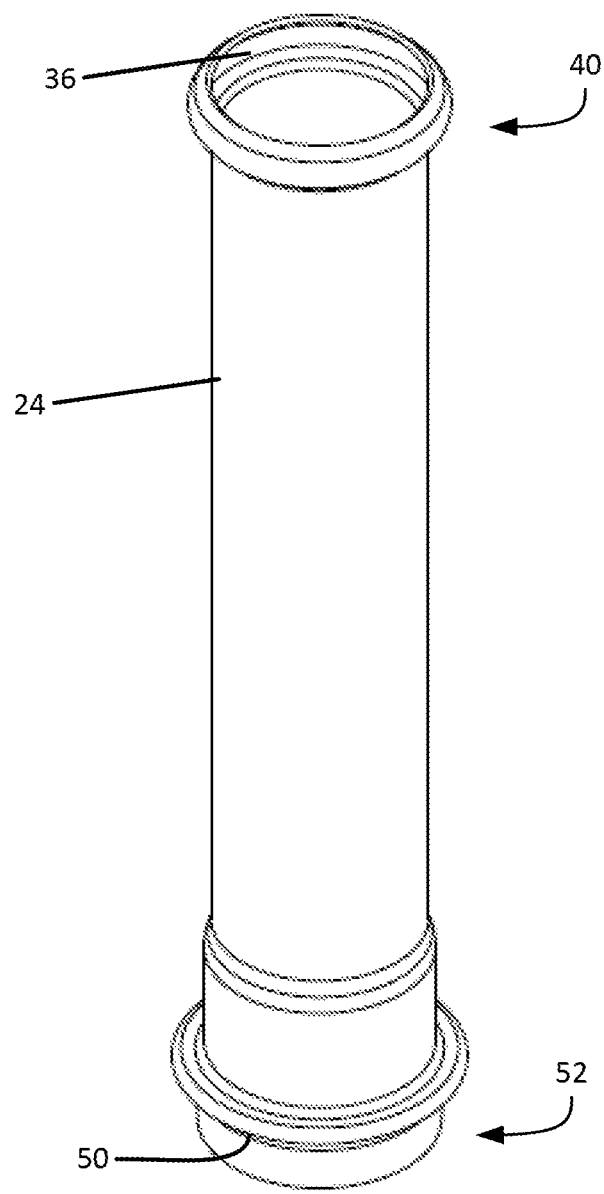
FIG. 3 is a perspective view of a first tube of the pushrod cover assembly of FIG. 2.

FIG. 3 is a perspective view of the first tube 24 of the pushrod tube cover assembly 8 of FIG. 2. The annular groove 36 formed in the first end 40 of the first tube 24 envelops the annular seal 32 (not shown in FIG. 3) such that the annular seal 32 is fixed in position within the groove 36 when the second tube 28 is positioned within the first tube 24. The groove 36 at least partially covers an upper portion of the seal 32 such that the spring 68 does not act on the seal 32 when the spring contacts the first end 40 of the first tube 24. The envelopment of the seal 32 by the groove 36 at the first end 40 of the first tube 24 also helps maintain a position of the seal 32 in the groove 36 as the second tube 28 moves relative to the first tube 24. The groove 36 envelops the seal 32 and tapers toward the first end 40 so that the widest point (e.g., the diameter 88 of FIG. 4) of the groove 36 is spaced from the first end 40 of the first tube 24.

Figure 4:
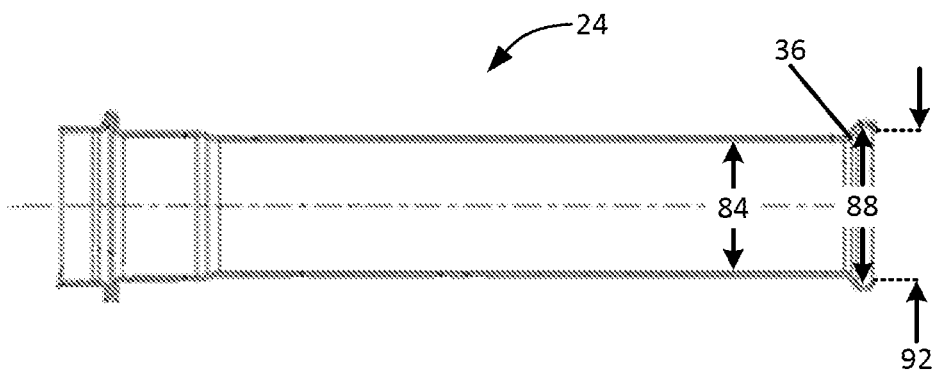
FIG. 4 is a side view of the first tube of FIG. 3.

FIG. 4 is a side view of the first tube 24 of FIG. 3. The first tube 24 has a first inner diameter 84 and the groove 36 has a second inner diameter 88 larger than the first inner diameter 84 of the first tube 24. The first tube 24 and the groove 36 may have a uniform thickness. An edge of the first tube 24 at the first end 40 has a third inner diameter 92 smaller than the second inner diameter 88 of the groove 36. The third inner diameter 92 is larger than the first inner diameter 84 of the first tube 24.

Figure 5:
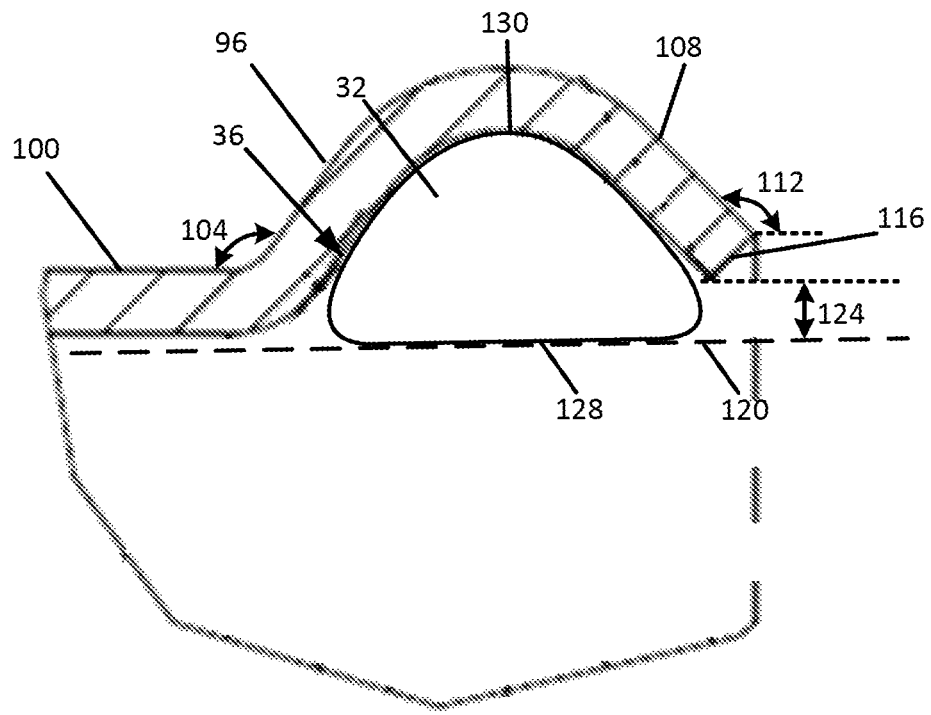
FIG. 5 is a partial cross-sectional view of an annular groove of the first tube of FIG. 3.

FIG. 5 is a partial cross-sectional view of the annular groove 36 of the first tube 24 of FIG. 3. The groove 36 has a first wall 96 extending (e.g., radially expanding) from an outer surface 100 of the first tube 24 at a first angle 104 and a second wall 108 extending (e.g., radially contracting toward a central axis of the tube) in a direction substantially perpendicular to the first wall 96 at a second angle 112. The second wall 108 terminates at an edge 116 that is spaced from the outer surface 120 of the second tube 28 by a first distance 124 when the second tube 28 is positioned in the first tube 24. The seal 32 is enveloped by the first and second walls 96, 108 of the groove 36 such that the seal 32 maintains a position within the groove between the first tube 24 and the second tube 28. The groove 36 compresses the seal 32 to form a contact surface 128 between the seal 32 and the outer surface 120 of the second tube 28 and one or more contact surfaces on the groove 36, such as contact surface 130, which may be separate contact areas or a continuous contact surface along the groove 36. The groove 36 may be formed by first forming a flange (e.g., the first wall 96) at the first end 40 of the first tube 24, wherein the flange extends annularly from the first 40 end at an angle (e.g., the first angle 104). Part of the flange (e.g., the second wall 108) is then bent at a second angle (e.g., the second angle 112) to form the second surface 108. The annular groove 36 is formed when the flange is bent. The seal 32 is then positioned within the groove 36.

Figure 6:
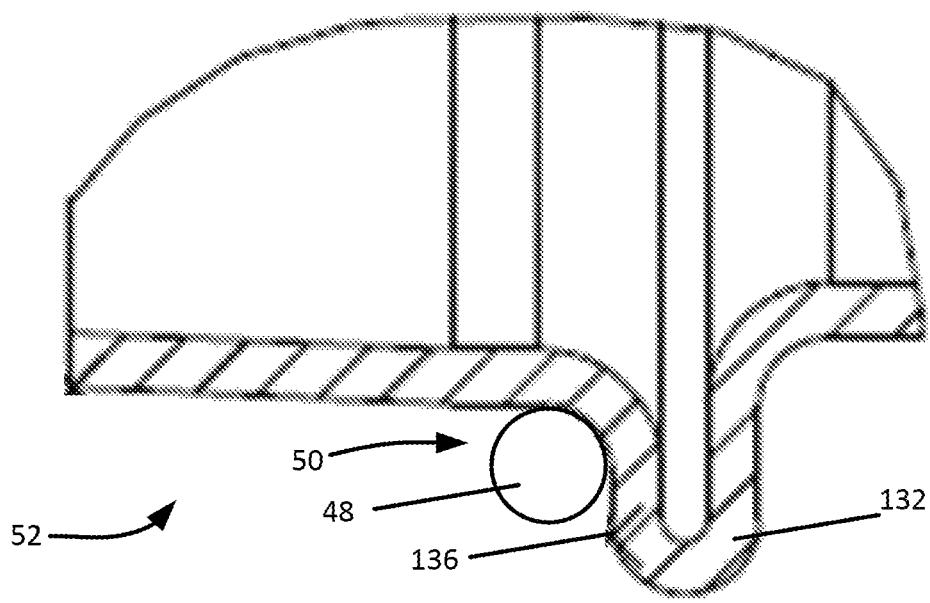
FIG. 6 is a partial cross-sectional view of a seal seat of the first tube of FIG. 3.

FIG. 6 is a partial cross-sectional view of the seal seat 50 of the first tube 24 of FIG. 3. The seal seat 50 is formed by a projection 132 from the first tube 24. The projection 132 has a surface 136 (e.g., a flat surface) on which the second annular seal 48 is positioned.

Figure 7:
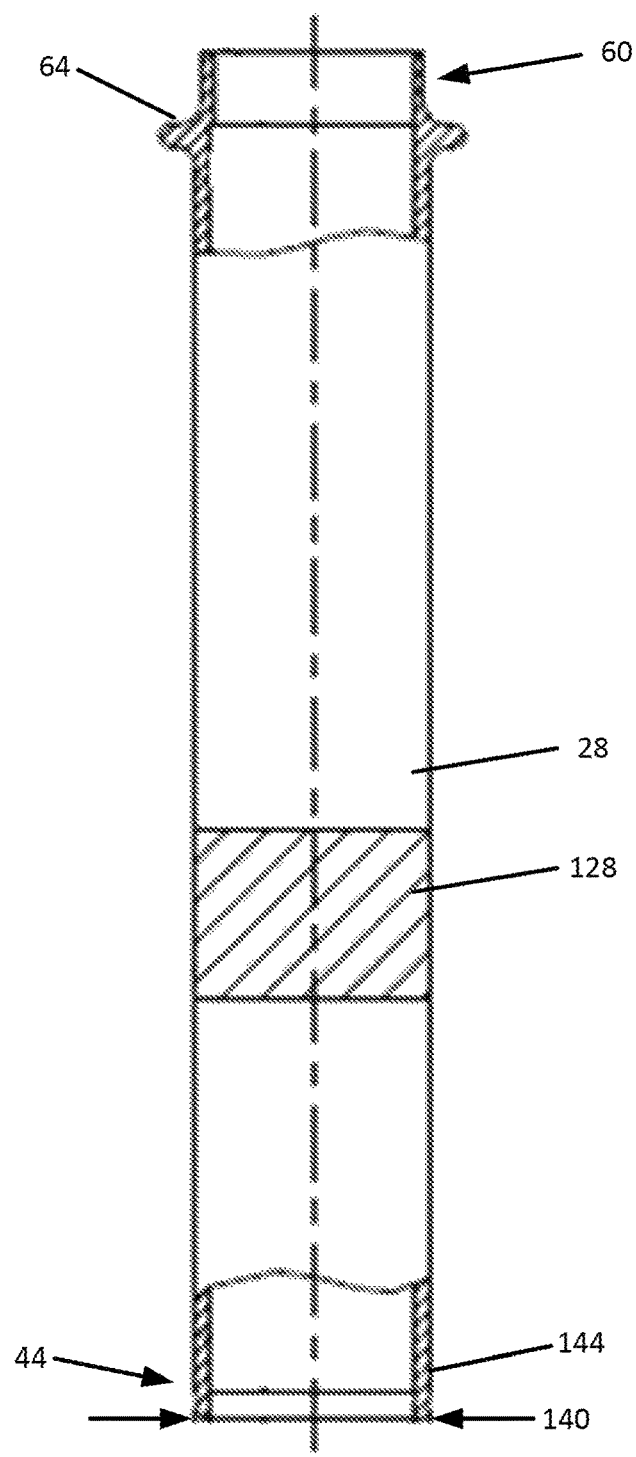
FIG. 7 is a cross-sectional view of a second tube of the pushrod cover assembly of FIG. 2.

FIG. 7 is a side view with a cross-sectional view of the second tube 28 of the pushrod tube cover assembly 8 of FIG. 2. The second tube 28 has an outer diameter 140 smaller than the first inner diameter 84 of the first tube 24. The second tube 28 fits within the first tube 24 and is sealed by the annular seal 32. The first end 44 of the second tube 28 includes a chamfer 144 to facilitate inserting the second tube 28 in the first tube 24 without damaging the seal 32 within the groove 36 of the first tube 24. The second end 60 of the second tube 28 includes the second seal seat 64 in which the third annular seal 56 is positioned. The second tube 28 also includes a seal contact surface 128 that is a different finish from the remainder of the second tube 28. The contact surface 128 may be polished to so that the contact surface 128 is smoother than the rest of the outer surface of the second tube 28.

Figure 8:
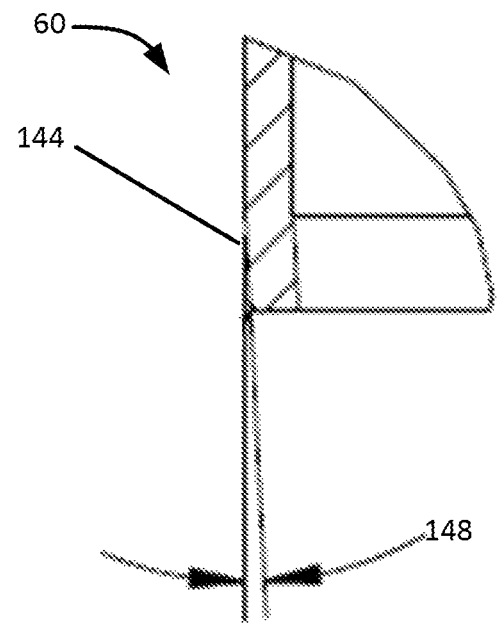
FIG. 8 is a partial cross-sectional view of the second tube of FIG. 7 depicting the chamfer angle of an end of the second tube.

FIG. 8 is a partial cross-sectional view of the second tube 28 of FIG. 7 depicting the chamfer 144 of the first end 44 of the second tube 28. The chamfer 144 has an angle 148 sufficient to facilitate inserting the second tube 28 in the first tube 24 without damaging the seal 32.

Figure 9:
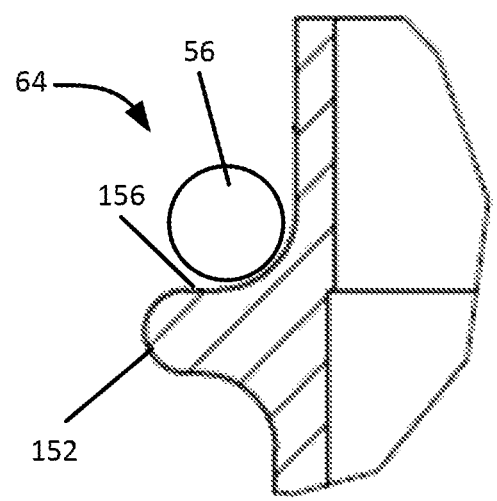
FIG. 9 is a partial cross-sectional view of a seal seat of the second tube of FIG. 7.

FIG. 9 is a partial cross-sectional view of the second seal seat 64 of the second tube 28 of FIG. 7. The second seal seat 64 is formed by a radial projection 152 or flange from the second tube 28. The projection 152 has a surface 156 (e.g., a flat surface) on which the third annular seal 56 is positioned.

The embodiment described above and illustrated in the figures is presented by way of example only and is not intended as a limitation upon the concepts and principles of the present invention. As such, it will be appreciated that various changes in the elements and their configuration and arrangement are possible without departing from the spirit and scope of the present invention.

What is claimed is:

1. A pushrod tube assembly for an engine, the pushrod tube assembly comprising:
    a first tube configured to cover a pushrod;
    a second tube configured to cover the pushrod, wherein the first tube has an inner diameter larger than an outer diameter of the second tube such that the second tube is configured to be slidably positioned in the first tube;
    an annular groove formed in a first end of the first tube, wherein a diameter of the groove is larger than the inner diameter of the first tube; and
    an annular seal disposed within the groove of the first tube to sealingly engage an outer surface of the second tube adjacent to a first end of the second tube.

2. The pushrod tube assembly of claim 1, wherein the groove has a first wall extending from an outer surface of the first tube at a first angle and a second wall extending in a perpendicular direction from the first wall at a second angle.

3. The pushrod tube assembly of claim 2, wherein the groove has an edge, the second wall terminating at the edge, wherein the edge is spaced from the outer surface of the second tube when the second tube is positioned in the first tube.

4. The pushrod tube assembly of claim 1, wherein the groove envelops the seal such that the seal is fixed in position within the groove when the second tube is positioned within the first tube.

5. The pushrod tube assembly of claim 1, wherein a sealing surface is disposed on the outer surface of the second tube, the sealing surface has a surface finish different from a surface finish of a remainder of the outer surface of the second tube.

6. The pushrod tube assembly of claim 1, wherein the groove compresses the seal to form a contact surface between the seal and the outer surface of the second tube.

7. The pushrod tube assembly of claim 1, wherein the first end of the second tube includes a chamfered edge.

8. The pushrod tube assembly of claim 1, further comprising a second annular seal positioned at a second end of the first tube and a third annular seal positioned at a second end of the second tube.

9. The pushrod tube assembly of claim 8, further including a spring positioned adjacent the first end of the first tube and a spring retainer configured to be positioned around the spring, wherein the spring is configured to compress the second and third annular seals.

10. A method for manufacturing a pushrod tube cover assembly, the method comprising:
   providing a first tube having a first diameter;
   providing a second tube having a second diameter, the second diameter smaller than the first diameter;
   forming a flange at a first end of the first tube, wherein the flange extends annularly from the first end at an angle;
   bending a portion of the flange at a second angle such that an annular groove is formed at the first end of the first tube;
   positioning an annular seal within the annular groove; and
   inserting the second tube into the first tube such that the seal is in sealing contact with an outer surface of the second tube.

11. The method of claim 10, further comprising forming a chamfer on a first end of the second tube.

12. The method of claim 11, further comprising forming a first seal seat at a second end of the first tube.

13. The method of claim 12, further comprising forming a second seal seat at a second end of the second tube.

14. The method of claim 10, further comprising positioning a spring on an edge of the annular groove.

15. The method of claim 14, further comprising positioning a retainer over the spring and positioning a spring keeper on the second tube, such that the retainer and the spring keeper preload the spring.

16. The method of claim 15, further comprising positioning a second seal at a second end of the first tube and positioning a third seal at a second end of the second tube, wherein the preload of the spring is applied to the second and third seals.

17. The method of claim 10, further comprising polishing a portion of the outer surface of the second tube adjacent the seal to have a different surface finish than a remainder of the outer surface, and arranging the seal to contact the portion of the outer surface with the different surface finish.

* * * * *